(12) United States Patent
JongChil

(10) Patent No.: US 7,372,212 B2
(45) Date of Patent: May 13, 2008

(54) LAMP, METHOD OF DRIVING THE LAMP, BACKLIGHT ASSEMBLY AND LIQUID CRYSTAL DISPLAY DEVICE HAVING THE BACKLIGHT ASSEMBLY

(75) Inventor: Lee JongChil, Gyeongbuk (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 0 days.

(21) Appl. No.: 11/321,363

(22) Filed: Dec. 28, 2005

(65) Prior Publication Data

US 2007/0001609 A1    Jan. 4, 2007

(30) Foreign Application Priority Data

Jun. 30, 2005  (KR) .................. 10-2005-0058000

(51) Int. Cl.
*H05B 37/00*    (2006.01)
(52) U.S. Cl. ............... 315/239; 315/274; 315/326; 315/219
(58) Field of Classification Search .......... 315/DIG. 5, 315/209 R, 326; 313/484, 491, 607, 46, 313/633, 637
See application file for complete search history.

(56) References Cited

U.S. PATENT DOCUMENTS

| | | | | |
|---|---|---|---|---|
| 4,260,933 A | * | 4/1981 | Volland | ...................... 315/326 |
| 5,107,183 A | * | 4/1992 | Yamamoto et al. | ...... 315/209 R |
| 5,612,590 A | * | 3/1997 | Trushell et al. | ............. 313/487 |
| 6,172,453 B1 | * | 1/2001 | Hamada et al. | ............. 313/491 |
| 6,359,376 B1 | * | 3/2002 | Hollstein et al. | ............. 313/46 |
| 6,445,118 B1 | * | 9/2002 | Shimizu et al. | ............. 313/484 |
| 6,515,433 B1 | * | 2/2003 | Ge et al. | ................. 315/227 R |
| 6,603,249 B2 | * | 8/2003 | Garner | ....................... 313/274 |
| 2003/0160554 A1 | * | 8/2003 | Soules et al. | ................ 313/272 |
| 2005/0017644 A1 | * | 1/2005 | Ono et al. | ................... 313/633 |
| 2006/0113885 A1 | * | 6/2006 | Iimura | ........................ 313/485 |
| 2006/0113886 A1 | * | 6/2006 | Trushell | ..................... 313/489 |

* cited by examiner

Primary Examiner—Douglas W. Owens
Assistant Examiner—Chuc Tran
(74) Attorney, Agent, or Firm—Brinks Hofer Gilson & Lione

(57) ABSTRACT

A lamp, a method of driving the lamp, a backlight assembly having the lamp, and a liquid crystal display (LCD) device having the backlight assembly are disclosed. The lamp includes a tube that contains gas and first through fourth electrodes. The first and second electrodes are disposed in the tube adjacent to first and second ends of the tube. The third and fourth electrodes are disposed at the first and second ends of the tube. Voltages applied to the electrodes are sufficient for light to be emitted throughout the lamp. The first and second voltages, third and fourth voltages, first and third voltages, and second and fourth voltages have different polarities while the first and fourth voltages and the second and third voltages have the same polarity.

19 Claims, 5 Drawing Sheets

LAMP, METHOD OF DRIVING THE LAMP, BACKLIGHT ASSEMBLY AND LIQUID CRYSTAL DISPLAY DEVICE HAVING THE BACKLIGHT ASSEMBLY

TECHNICAL FIELD

The present invention relates to a light source, and more particularly, to a lamp, a method of driving the lamp, a backlight assembly having the lamp, and a liquid crystal display (LCD) device having the backlight assembly.

DESCRIPTION OF THE RELATED ART

A cathode ray tube (CRT) is generally used as a monitor for a television (TV), a measuring instrument, an information terminal, and the like. However, due to the weight and size of the CRT, it is difficult to reduce the weight and size of an electronic device containing the CRT. Thus, as smaller and lighter electronic devices are presently desirable, a CRT is currently becoming less attractive for use in devices. Therefore, a variety of display devices such as a liquid crystal display (LCD) device, a plasma display panel (PDP) and an electro luminescence display (ELD) that can replace the CRT has been proposed.

Especially, since the LCD device can be miniaturized, is lightweight and has low electric power consumption, it has been applied to a variety of electronic devices. Examples of electronic devices include a monitor for a laptop computer as well as a desktop computer and a large-sized display unit. Therefore, it is expected that demand for the LCD devices will sharply increase in the future.

The LCD device is a light absorption device that displays an image by adjusting an amount of incident light transmitted. A special light source such as a backlight assembly for irradiating a liquid crystal panel with light is used for the LCD device. The backlight assembly is classified into an edge type and a direct type according to a location where a lamp unit is installed. Furthermore, a fluorescent lamp provided in the backlight assembly include a cold cathode fluorescent lamp (CCFL) where an electrode is located in the fluorescent lamp and an external electrode fluorescent lamp (EEFL) where an electrode is located out of the fluorescent lamp.

FIG. 1 illustrates an exploded perspective view of a backlight assembly according to the related art.

As shown in FIG. 1, a backlight assembly of the related art includes a plurality of lamps 20 emitting light, a reflective plate 40 disposed below the lamps 20 to reflect the light, a plurality of optical sheets 10 disposed above the lamps 20 to diffuse and condense the light, and a lower case 50 for fixing the lamps 20, the reflective plate 40 being adhered to the lower case 50. This backlight assembly is a direct type backlight assembly.

Each of the lamps 20 includes a glass tube 21, internal electrodes 22 and 23 located in the glass tube 21, and electric power terminals 24 and 25 connected to the internal electrodes 22 and 23 and exposed to an external side. This lamp 20 is a CCFL.

The optical sheets include a diffusion sheet for diffusing the light, a prism sheet for collecting the diffused light, and a protection sheet for protecting the diffusion sheet and the prism sheet.

Although not illustrated in the drawing, an LCD device may be constituted by adding, in addition to the backlight assembly, a liquid crystal panel (not shown) disposed above the backlight assembly to display an image, a panel guide (not shown) for fixing the liquid crystal panel, and a top case (not shown) for protecting the liquid crystal panel.

A predetermined voltage is applied from an inverter (not shown) to the internal electrodes 22 and 23 via the electric power terminals 24 and 25. A voltage applied to the internal electrodes 22 and 23 causes the lamps 20 to emit light. The light emitted from the lamps 20 irradiates the liquid crystal panel after being diffused and collected by the optical sheets 10.

FIG. 2 illustrates the CCFL depicted in FIG. 1.

As shown in FIG. 2, the CCFL includes the glass tube 21, the internal electrodes 22 and 23 formed on opposite sides of the glass tube 21, respectively, and the electric power terminals 24 and 25 connected to the internal electrodes 22 and 23, respectively. The internal electrodes 22 and 23 are formed at locations spaced apart by predetermined distances from opposite ends of the glass tube 21.

A phosphor material (not shown) is deposited on an inner wall of the glass tube 21. A mixture of gases 30 including mercury, argon, neon, and the like is filled in the glass tube 21.

The electric power terminals 24 and 25 are connected to the internal electrodes 22 and 23, respectively, and extend out of the glass tube 21 in order to apply a predetermined voltage to the internal electrodes 22 and 23. The predetermined voltage is applied to the internal electrodes 22 and 23 via the electric power terminals 24 and 25 to generate an electric field. The cathode internal electrode 22 emits electrons. The electrons move toward the anode internal electrode 23, in the course of which the electrons collide with the gas 30. The collision between the electrons and the gas 30 generates ultraviolet rays. The ultraviolet rays excite the phosphor material 30 to emit light.

However, in the backlight assembly of the related art, since the internal electrodes 22 and 23 are spaced apart from the opposite ends of the glass tube 21, the light is generated only at a space between the internal electrodes 22 and 23. That is, the light is not generated at spaces defined between the internal electrodes 22 and 23 and the respective opposite ends of the glass tube 21. That is, the electrons generated by the internal electrodes 22 and 23 move only between the internal electrodes 22 and 23, in the course of which the electrons collide with the gas to generate the light. However, since there are no electrons generated (and thus no movement of the electrons) between the internal electrode 22 and the adjacent end of the glass tube 21 and between the internal electrode 23 and the adjacent end of the glass tube 21, no light is generated in these regions. Namely, the space defined between the internal electrodes 22 and 23 becomes an effective region where the light is generated and emitted while the spaces defined between the internal electrode 22 and the adjacent end and between the internal electrode 23 and the adjacent end become the dead regions A and A' when no light is generated and emitted. The dead regions A and A' cause deterioration of the image quality since they do not emit light.

SUMMARY

By way of introduction only, in various embodiments, a lamp, a backlight assembly containing multiple lamps, a liquid crystal display containing the backlight assembly, and a method of driving the lamp are described. The lamp includes a tube containing gas, first and second electrodes disposed in the tube adjacent to first and second ends of the tube, and third and fourth electrodes disposed at the first and second ends of the tube, respectively, such that a first region of the lamp is formed between the first and second electrodes, a second region of the lamp is formed between the first and third electrodes, and a third region of the lamp is formed between the second and fourth electrodes.

One embodiment of a method of operating the lamp having the above includes applying first to fourth voltages to the first to fourth electrodes, respectively, sufficient for light to be emitted in the first, second, and third regions. The first and second voltages, third and fourth voltages, first and third voltages, and second and fourth voltages have different polarities while the first and fourth voltages and the second and third voltages have the same polarity.

An embodiment of a backlight assembly comprises a case, a plurality of the lamps, a reflective plate disposed between the case and the lamps, and an optical member disposed on an opposite side of the lamps as the reflective plate.

An embodiment of a liquid crystal display comprises a first case, a second case coupled to the first case, the backlight assembly disposed between the first and second cases, and a liquid crystal panel disposed between the backlight assembly and the second case.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to examples which are illustrated in the accompanying drawings. Wherever possible, the same reference numbers will be used throughout the drawings to refer to the same or like parts.

Figure 1:
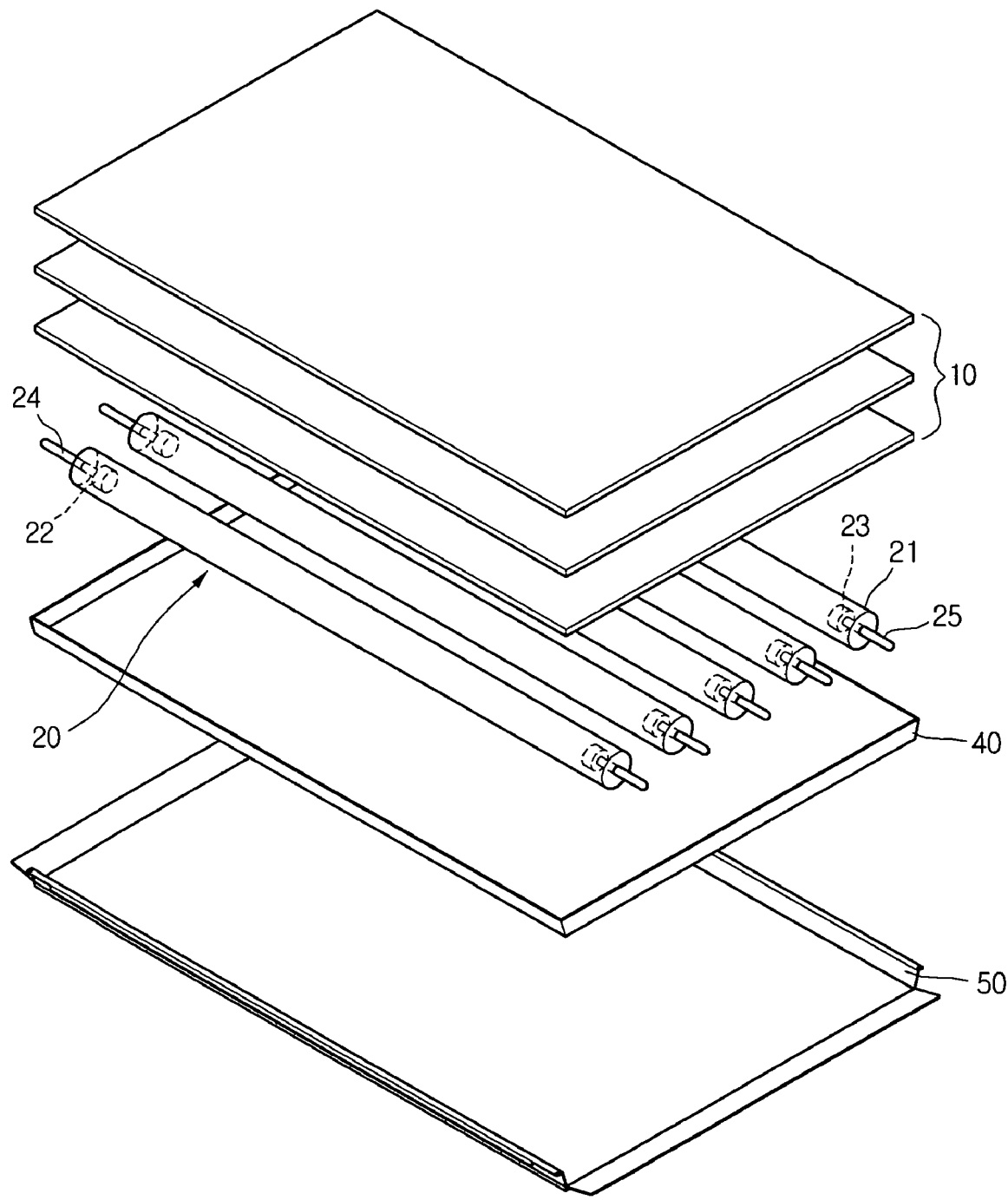
FIG. 1 an exploded perspective view of a backlight assembly according to the related art.
Figure 2:
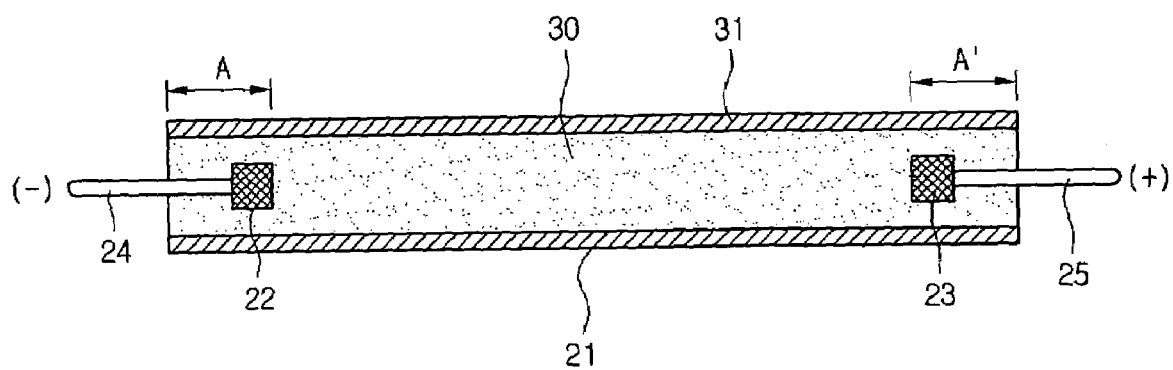
FIG. 2 is a sectional view of a CCFL illustrated in FIG. 1.
Figure 3:
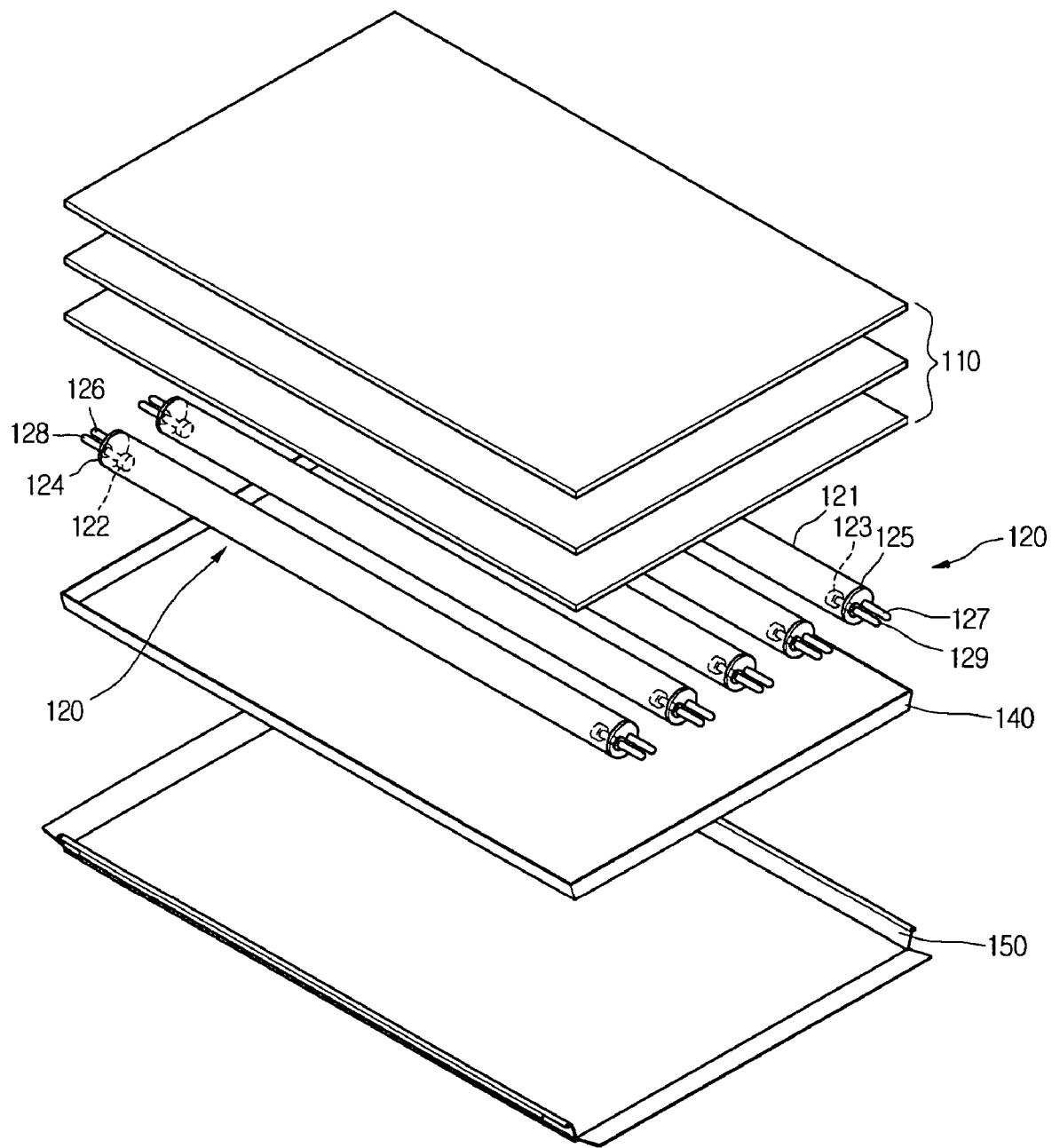
FIG. 3 is an exploded perspective view of a backlight assembly according to an embodiment of the present invention.

FIG. 3 illustrates an exploded perspective view of a backlight assembly according to an embodiment of the present invention.

A backlight assembly shown in FIG. 3 includes a plurality of lamps 120 (e.g. CCFLs) generating light, a reflective plate 140 disposed below the lamps 120 to reflect incident light, a plurality of optical sheets 110 disposed above the lamps 120 to diffuse and condense the light, and a lower case 150 for fixing the lamps 120, the reflective plate 140 being adhered to the lower case 150. The optical sheets 110 include a diffusion sheet for diffusing the light, a prism sheet for collecting the diffused light, and a protection sheet for protecting the diffusion sheet and the prism sheet.

Figure 4:
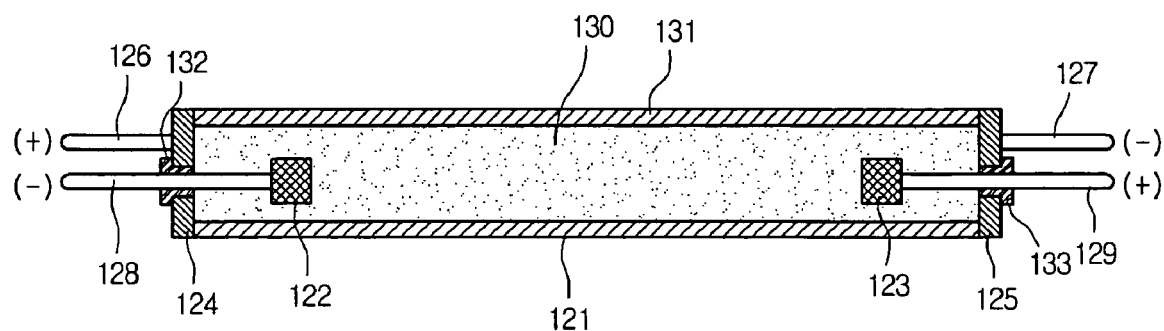
FIG. 4 is a sectional view of a CCFL illustrated in FIG. 3.

FIG. 4 illustrates a sectional view of the CCFL depicted in FIG. 3.

As shown in FIG. 4, the CCFL 120 includes a glass tube 121, first and second external electrodes 124 and 125 respectively formed on an opposite outer ends of the glass tube 121, first and second electric power terminals 126 and 127 respectively connected to the first and second external electrodes 124 and 125, first and second internal electrodes 122 and 123 formed on opposite inner sides of the glass tube 121, and third and fourth electric power terminals 128 and 129 respectively connected to the first and second internal electrodes 122 and 123. The tube 121 can also be formed using any suitable transparent and insulating material or combination of materials.

A phosphor material (not shown) is deposited on an inner wall of the glass tube 121. One or more gases 130 including mercury, argon, neon, and the like fill the glass tube 121.

A taping method using a metal tape such as copper and aluminum tapes or a plating method plating metal (or other conductive material) on the opposite outer ends of the glass tube 121 may be used to form the first and second external electrodes 124 and 125 on the opposite outer ends of the glass tube 121. The first and second internal electrodes 122 and 123 are formed at locations spaced from the corresponding adjacent inner ends of the glass tube 121. The third and fourth electric power terminals 128 and 129 respectively connected to the first and second internal electrodes 122 and 123 extend through the opposite ends of the glass tube 121 so that they can be exposed to the external side.

The constitution of the first and second internal electrodes 122 and 123 and the third and fourth electric power terminals 128 and 129 is similar to that of the related art. The first and second external electrodes 124 and 125 are provided on the opposite outer ends of the glass tube 121.

To test or otherwise operate a lamp, a first voltage having a negative (−) voltage level may be applied to the first internal electrode 122 and a second voltage having a positive (+) voltage level may be applied to the second internal electrode 123. A third voltage having a positive (+) voltage level may be applied to the first external electrode 124 and a fourth voltage having a negative (−) voltage level may be applied to the second external electrode 125. That is, the polarities of the first and fourth voltages are identical, the polarities of the second and third voltages are identical, and the polarities of the first/fourth voltages and the second/third voltages are different. The magnitudes of the first and fourth voltages may be substantially the same or different. Similarly, the magnitudes of the second and third voltages may be substantially the same or different. If the magnitudes are different, the magnitudes can be set such that the electric fields in each region (a first region between the first and second electrodes, a second region between the first and third electrodes, and a third region between the second and fourth electrodes) are substantially the same.

The third and fourth electric power terminals 128 and 129 are respectively connected to the first and second internal electrodes 122 and 123 after penetrating the first and second external electrodes 124 and 125. In this case, a short circuit may occur between the third electric power terminal 128 and the first external electrode 124 and between the fourth electric power terminal 129 and the second external electrode 125. In order to prevent the short circuit, insulating connectors 132 and 133 are respectively provided between the first external electrode 124 and the third electric power terminal 128 and between the second external electrode 125 and the fourth electric power terminal 129.

The insulating connectors 132 and 133, similar to each of the electrodes, may be formed from a single material or multiple layers. The insulating connectors 132 and 133 extend through the entire thickness of the first and second external electrodes 124 and 125, respectively. The third and fourth electric power terminals 128 and 129 are electrically connected to the first and second internal electrodes 122 and 123 via the insulating connectors 132 and 133. Gaps defined between the insulating connector 132 and the first external electrode 124, between the insulating connector 133 and the second external electrode 125, between the insulating connector 132 and the third electric power terminal 128, and between the insulating connector 133 and the fourth electric power terminal 129 may be sealed to retain the gas 130 within the glass tube 121.

Although not illustrated in the drawing, an LCD device is constituted by adding, in addition to the backlight assembly, a liquid crystal panel (not shown) disposed above the backlight assembly to display an image, a panel guide (not shown) for fixing the liquid crystal panel, and a top case (not shown) for protecting the liquid crystal panel.

In the above-described CCFL, the first voltage is applied to the first and second external electrodes 124 and 125 via the first and second electric power terminals 126 and 127 and the second voltage is applied to the first and second internal electrodes 122 and 123 via the third and fourth electric power terminals 128 and 129. In this case, the third voltage having the positive (+) voltage level may be applied to the first external electrode 124, the fourth voltage having the negative voltage level (−) may be applied to the second external electrode 125, the first voltage having the negative (−) voltage level may be applied to the first internal electrode 122, and the second voltage having the positive (+) voltage level may be applied to the second internal electrode 123. The electrons are emitted from the first internal electrodes 122. The emitted electrons move toward the second internal electrode 123 due to the second voltage having the positive (+) voltage level applied to the second internal electrode 123. The electrons moving toward the second internal electrode 123 may collide with the gas in the glass tube 121 to generate ultraviolet rays. The ultraviolet rays excite the phosphor material deposited on the inner wall of the glass tube 121. Therefore, the light is generated in a space defined between the first and second internal electrodes 122 and 123.

In addition, the electrons emitted from the first internal electrode 122 move toward the first external electrode 124 due to the third voltage having the positive (+) voltage level applied to the first external electrode 124. Therefore, light is generated in a space defined between the first internal electrode 122 and the first external electrode 124. Likewise, since the voltage having the negative (−) voltage level is applied to the second external electrode 125, electrons are emitted from the second external electrode 125. The electrons emitted from the second external electrode 125 move toward the second internal electrode 123 to which the second voltage having the positive (+) voltage level is applied. Therefore, the light is generated in a space defined between the second external electrode 125 and the second internal electrode 123.

As a result, the glass tube emits light over the all of the spaces defined between the first external electrode 124 and the first internal electrode 122, between the first and second internal electrodes 122 and 123, and between the second internal electrode 123 and the second external electrode 125. Thus, the backlight assembly of FIG. 4 emits light throughout the regions defined between the opposite ends of the CCFL, thereby preventing deterioration of the image quality.

Figure 5:
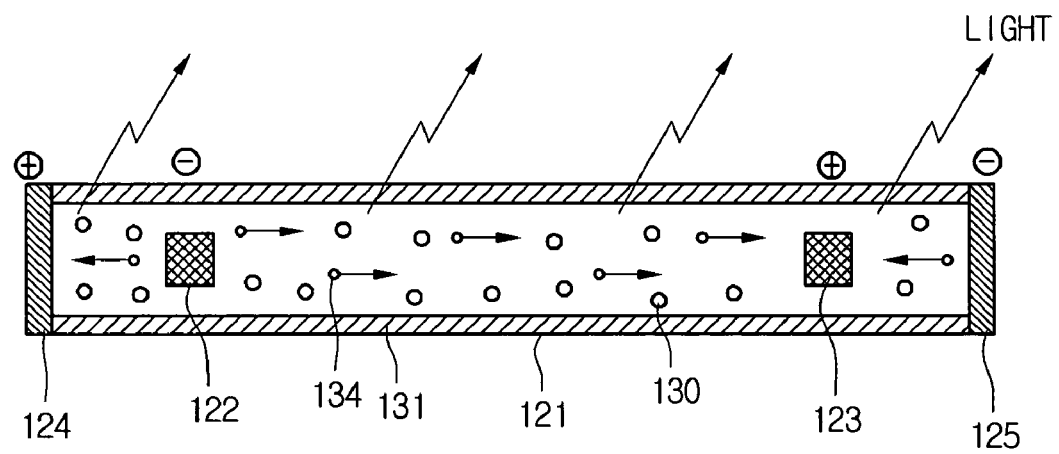
FIG. 5 is a sectional view illustrating a light generation theory of a CCFL illustrated in FIG. 3.

FIG. 5 illustrates a sectional view illustrating a light generation theory of a CCFL illustrated in FIG. 3.

As shown in FIG. 5, the third voltage having a positive (+) voltage is applied to the first external electrode 124, the fourth voltage having a negative (−) voltage is applied to the second external electrode 125, the first voltage is applied to the first internal electrode 122, and the second voltage is applied to the second internal electrode 123. As above, the first and second internal electrodes 122 and 123 have different voltage polarities than the first and second external electrodes 124 and 125.

Electrons 134 are emitted from the first internal electrode 122 and the second external electrode 125. The electrons 134 emitted from the first internal electrode 122 move toward the second internal electrode 123 and the first external electrode 124. The electrons moving toward the second internal electrode 123 collide with the gas 130 to generate the ultraviolet rays. The ultraviolet rays excite the phosphor material 131 to generate light between the first and second internal electrodes 122 and 123. In addition, the electrons moving toward the first external electrode 124 collide with the gas 130 to generate the ultraviolet rays. The ultraviolet rays excite the phosphor material 131 to generate light between the first internal electrode 122 and the first external electrode 124.

Meanwhile, the electrons 134 emitted from the second external electrode 125 move toward the second internal electrode 123. The electrons moving toward the second internal electrode 123 collide with the gas 130 to generate the ultraviolet rays. The ultraviolet rays excite the phosphor material 131 to generate light between the second external electrode 125 and the second internal electrode 123.

Figure 6:
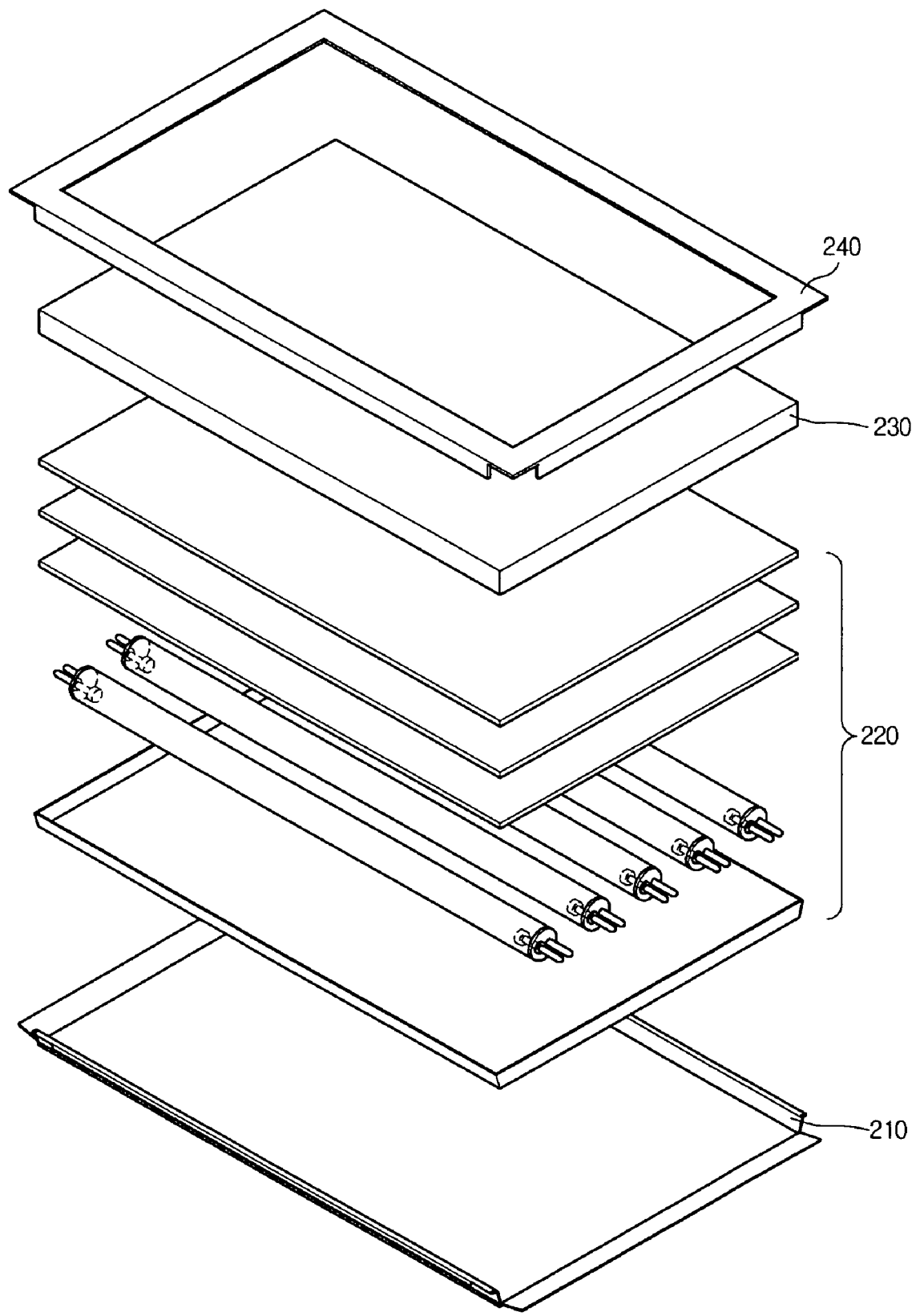
FIG. 6 is an exploded perspective view of an LCD containing the backlight assembly of FIG. 3.

A liquid crystal display 200 is shown in FIG. 6. The liquid crystal display 200 includes a first case 210, a backlight assembly 220 disposed on the first case 210, a liquid crystal panel 230 disposed on the backlight assembly 220, and a second case 240 coupled to the first case 210. Although other components may be present, they are not shown for clarity. For example, the liquid crystal panel 230 may be an active matrix or passive matrix display with polarizers and alignment films. The liquid crystal panel 230 may contain a color filter substrate that includes color filters and perhaps a black matrix and/or common electrodes, and an array substrate that includes signal lines, common lines, switches such as transistors, pixel electrodes and perhaps common electrodes.

In other embodiments, the first and second external electrodes may be formed such that they cover all or a portion of the inner surfaces of the ends of the tube. In this case, an insulating material (either the insulating connectors 132 and 133 or other material) may be disposed on the outer surfaces of the ends of the tube and the first and second electric power terminals 126 and 127 extend through the insulating material. The insulating material can seal the edges of the tube and the first and second external electrodes extend over the inner surface of the end of the tube only over the area contacted by the gas. Alternatively, the first and second external electrodes can extend over the entire surface area of the inner surface of the end of the tube with the insulating material covering the outer surface.

As described above, by forming external electrodes on the external sides of the CCFL and applying voltages having different polarity from those applied to the adjacent internal electrodes, light is emitted from all of the regions of the CCFL, thereby improving the image quality by preventing a dark region from occurring at the edges of the CCFL.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A lamp comprising:

a tube containing gas;

first and second electrodes disposed in the tube adjacent to first and second ends of the tube; and third and fourth electrodes disposed at the first and second ends of the tube, respectively, such that a first region of the lamp is formed between the first and second electrodes, a second region of the lamp is formed between the first and third electrodes, and a third region of the lamp is formed between the second and fourth electrodes, wherein first to fourth voltages are respectively applied to the first to fourth electrodes, and wherein first light is generated in the first region due to the first and second voltages applied to the first and second electrodes, second light is generated in the second region due to the first and third voltages applied to the first and the third electrodes, and third light is generated in the third region due to the second and fourth voltages applied to the second and fourth electrodes.

2. The lamp according to claim 1, further comprising first, second, third, and fourth electric power terminals electrically connected to the first, second, third and fourth electrodes, respectively.

3. The lamp according to claim 2, wherein the first and second electric power terminals are respectively connected to the first and second electrodes, respectively, and the first and second electric power terminals extend through and are isolated from the third and fourth electrodes, respectively.

4. The lamp according to claim 3, further comprising a first insulating connector between the first electric power terminal and the third electrode and a second insulating connector between the second power electric terminal and the fourth electrode.

5. The lamp according to claim 4, wherein the first and second electric power terminals are respectively connected to the first and second electrodes through the first and second insulating connectors.

6. The lamp according to claim 4, wherein the first and second connectors comprises a material different from the tube.

7. The lamp according to claim 2, wherein the first and third electric power terminals extend from the first end of the tube, and the second and fourth electric power terminals extend from the second end of the tube.

8. The lamp according to claim 1, wherein the third and fourth electrodes each comprise a metal tape adhered to the first and second ends of the tube, respectively.

9. The lamp according to claim 1, wherein the third and fourth electrodes each comprise a plated conductive material on the first and second ends of the tube, respectively.

10. The lamp according to claim 1, wherein each of the third and fourth electrodes extend over the entire inner surface of the first and second ends of the tube, respectively.

11. The lamp according to claim 1, wherein the first to fourth voltages are respectively set such that the first to third lights have all the same intensity.

12. A method of driving a lamp having a tube containing gas, first and second electrodes disposed in the tube adjacent to first and second ends of the tube, and third and fourth electrodes disposed at the first and second ends of the tube such that a first region is formed between the first and second electrodes, a second region is formed between the first and third electrodes, and a third region is formed between the second and fourth electrodes, the method comprising applying first to fourth voltages to the first to fourth electrodes, respectively, wherein first light is generated in the first region due to the first and second voltages applied to the first and second electrodes, second light is generated in the second region due to the first and third voltages applied to the first and the third electrodes, and third light is generated in the third region due to the second and fourth voltages applied to the second and fourth electrodes.

13. The method according to claim 12, wherein the first and second voltages have different polarities.

14. The method according to claim 12, wherein the third and fourth voltages have different polarities.

15. The method according to claim 12, wherein the first and third voltages have different polarities.

16. The method according to claim 12, wherein the second and fourth voltages have different polarities.

17. The method according to claim 12, wherein the first and fourth voltages have the same polarity.

18. The method according to claim 12, wherein the second and third voltages have the same polarity.

19. The method according to claim 12, wherein the first to fourth voltages are respectively set such that the first to third lights have all the same intensity.

* * * * *